United States Patent [19]
Kildishev et al.

[11] 3,746,979
[45] July 17, 1973

[54] APPARATUS FOR MEASURING THE INSULATION RESISTANCE OF THE ROTOR OF A BRUSHLESS SYNCHRONOUS MACHINE

[76] Inventors: Vasily Semenovich Kildishev, Plekhanovskaya ulitsa, 41/43, kv. 55, Kharkov; Gely Alexeevich Kovalkov, Leningradsky prospekt, 26, kv. 174, Moscow; Nikolai Sergeevich Maznikin, ulitsa B. Pochtovaya, 14/16, kv. 61, Moscow; Alexandr Vasilievich Misjulin, Vyazemskaya ulitsa, 24, kv. 23, Moscow; Alexandr Vladimirovich Lebedev, Konkovo-Derevlevo, 6, mikroraion, 26 "G", kv. 325, Moscow, all of U.S.S.R.

[22] Filed: July 8, 1971

[21] Appl. No.: 160,818

[52] U.S. Cl. ............... 324/51, 318/490, 322/99
[51] Int. Cl. .................. G01r 31/02, H02k 11/00
[58] Field of Search ............ 324/51.54; 318/490; 322/99

[56] References Cited
UNITED STATES PATENTS 3,303,410  2/1967  Hoover et al. ............... 324/51 X
3,593,123  7/1971  Williamson ................... 324/51

Primary Examiner—Gerard R. Strecker
Attorney—Eric H. Waters, Johng. Schwartz and J. Harold Nissen

[57] ABSTRACT

An apparatus is provided for measuring the insulation resistance of, and the voltage across, the rotor of a brushless synchronous machine. The apparatus is characterized in that the rotor of the synchronous machine is coupled to an insulation-resistance measuring unit via a synchronous generator with a rotary rectifier and an exciter, such that the field winding of the synchronous generator together with the rotary rectifier and the armature winding of the exciter are series-connected between the zero-potential datum point of the rotor of the synchronous machine and the rotor frame. The rotary rectifier is shunted with resistors. A supply source in measuring the insulative resistance is connected, in one of the various positions of a switch, to the inductor winding of the excitor. The meter of the insulation-resistance measuring unit is connected in separate positions of the switch to the armature winding of the synchronous generator and the inductor winding of the exciter, while, in the brake-down alarm position of a switch, the meter is connected to the armature winding of the synchronous generator.

4 Claims, 4 Drawing Figures

APPARATUS FOR MEASURING THE INSULATION RESISTANCE OF THE ROTOR OF A BRUSHLESS SYNCHRONOUS MACHINE

The present invention relates to instrumentation for rotary machines, and more specifically to an apparatus for measuring the insulation resistance of the rotor of a brushless synchronous machine.

An apparatus is known for measuring the insulation resistance of the rotary part of a circuit, such as the rotor of a large brushless synchronous machine. This known apparatus comprises an an insulation-measuring unit, a supply source, and a coupling unit connecting the rotor of said machine to the insulation-resistance measuring unit via a switch (see, for example, D.B. Hoover, The Brushless Excitation System for Large A.C. Generators, Westinghouse Engineer, Vol. 24, No. 5, 1964).

In this known apparatus, the coupling unit comprises slip-rings and brushes which are held on to the slip-rings during measurements by an electromagnet energized from a supply source.

This known apparatus suffers from a number of disadvantages. It uses rubbing contacts which necessitate substantial servicing and impair the reliability of measurements. The current-conducting dust accumulating on the brushes and slip-rings reduces the insulation level of the associated machine. It has moving parts which likewise call for servicing and impair the reliability of measurements due to seizures which are likely to occur and other factors. Measurement data do not come in uninterruptedly and furthermore the apparatus cannot be used in protection circuits.

It is an object of the present invention to avoid the above-mentioned disadvantages.

The invention aims at providing an improved apparatus for measuring the insulation resistance of, and the voltage across, the rotor of a brushless synchronous machine, which apparatus insures improved accuracy of measurements, is simple in service, speeds up the measuring procedure, can measure the insulation resistance under load, and has small overall axial dimensions.

The objects of the invention are achieved by providing a coupling unit connecting the rotor of a brushless synchronous machine to the insulation resistance measuring unit as a measuring synchronous generator and a measuring exciter mounted on a common shaft with the synchronous machine, and feeding the rotating field winding of the measuring synchronous generator from the armature winding of the measuring exciter through a rotary rectifier. The field winding of the measuring synchronous generator and the rotary rectifier connected to it are connected between the zero-potential (datum) point of the rotor circuit of the brushless synchronous machine and the frame of this rotor, at least some of the diodes of the rotary rectifier being shunted by resistors.

The supply source is connected to the stationary winding of the measuring exciter inductor, whereas the meter of the measuring unit is connected to the stationary winding of the measuring synchronous generator armature with the switch correspondingly positioned for measuring the insulation resistance. When the supply source is disconnected, the meter is connected to the armature winding of the measuring synchronous generator in insulation breakdown signalling operations with the switch correspondingly positioned.

In the coupling unit, the field winding of the measuring synchronous generator may be shunted by a diode connected in opposition to the rotary rectifier, and in the measuring unit the center-zero meter is connected in one of the switch positions to the like poles of two resistor-shunted rectifiers, one of which is connected to the armature winding of the measuring synchronous generator and the other to the winding of the measuring exciter inductor.

The zero-potential (datum) point for the rotor of the brushless synchronous machine may be the center tap on the winding of an induction voltage measuring unit placed in the rotor circuit of the synchronous machine.

In order to reduce the overall axial dimensions of the induction voltage sensor and of the apparatus as a whole, the armature winding of the former should preferably be of two or four layer three-phase construction with its end connections placed in a common plane normal to the axis of rotation of the armature.

An apparatus made as described herein has improved reliability, and simplifies the servicing of brushless excitation systems for large synchronous machine since it has no electric connections between the rotor circuits and stationary parts.

This apparatus can:

periodically measure the insulation resistance of the rotor circuits to frame at places stipulated by the associated operating instructions;

actuate an alarm in the case of an insulation breakdown and locate the break-down approximately;

continually measure the excitation voltage of the associated synchronous machine;

protect the machine against an insulation breakdown to the associated frame.

The invention will be more fully understood from the following description of preferred embodiments when read in connection with the accompanying drawings wherein.

Figure 1:
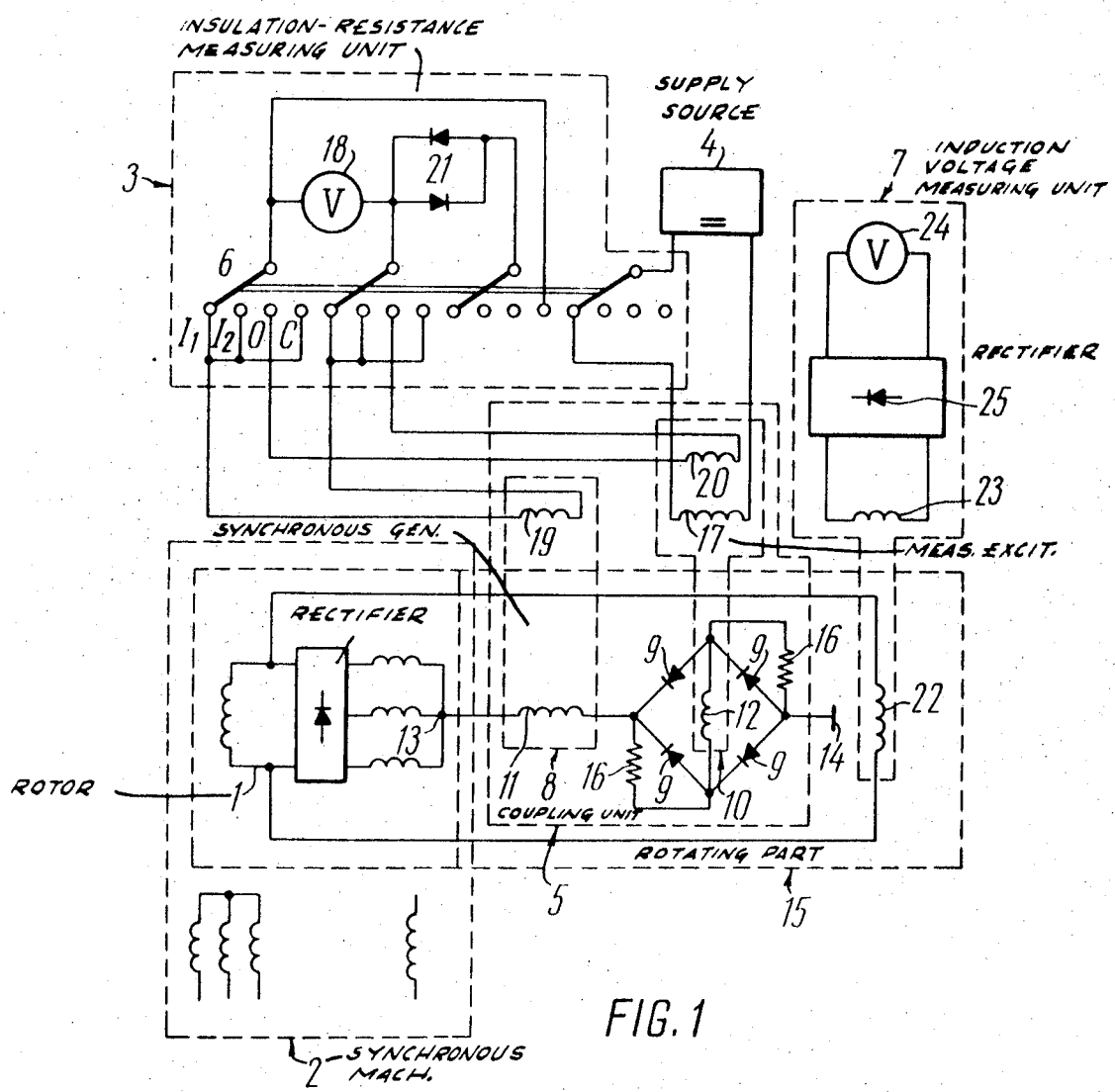
FIG. 1 is a schematic circuit diagram of an apparatus for measuring the insulation resistance of, and the voltage across, the rotor of a brushless synchronous machine.

In FIG. 1 is shown a first apparatus for measuring the insulation resistance of, and the voltage across, the rotor 1 of a brushless synchronous machine 2, comprising an insulation-resistance measuring unit 3, a supply source 4, a coupling unit 5 to connect the rotor 1 of said machine to the insulation-resistance measuring unit 3, connected via a switch 6, and an induction voltage measuring unit 7.

The coupling unit 5 is a synchronous generator 8 with a rotary rectifier 9 and a measuring exciter 10, such that the field winding 11 of the measuring synchronous generator 8 together with the rotary rectifier 9 and the armature winding 12 of the exciter 10 are series-connected between the zero-potential (datum) point 13 of the rotor 1 and a point 14 on the frame of the rotor 1. The rotating part 15 of the coupling unit 5 is mechanically connected to the frame of the rotor 1. The rotary rectifier 9 may be a bridge circuit as shown in FIG. 1, or any other circuit, such as a voltage doubler, or the like. It may be shunted by resistors 16 partly (as in FIG. 1) or fully (not shown).

In the $I_1$ position of the switch 6, shown in FIG. 1, the supply source 4 (which should preferably be current-stabilized) is connected to the inductor winding 17 of the measuring exciter 10, and the meter 18 to the armature winding 19 of the measuring synchronous generator 8.

In the $I_2$ position of the switch 6, the supply source 4 is disconnected from the winding 17. The remainder of the circuit is in the previously described state.

In the O position of the switch 6, instead of the winding 19, the meter 18 is connected to a winding 20 located on the inductor of the exciter, which may be either a separate winding, as shown in FIG. 1, or the inductor winding 17 itself. The supply source 4 is disconnected.

In the C position of the switch 6, the meter 18 is connected to the winding 19 via a limiter 21 based on crystal diodes or arranged in some other way. The supply source 4 is disconnected.

The induction voltage measuring unit 7 has an inductor winding 22 located on the rotary part 15 and connected to the + and − terminals of the rotor 1. The stationary circuit of the voltage measuring unit 7 comprises the armature winding 23 and a meter 24 which can be connected in any known manner with a rectifier 25 as shown in FIG. 1 or without it.

In the various positions of the switch 6, the apparatus disclosed herein operates as follows: in the $I_1$ position, it measures the insulation resistance; in the $I_2$ position, it measures the interference signal; in the O position, it determines the direction of the interference current; in the C position, it actuates the breakdown alarm.

The rotating and stationary windings of the measuring exciter 10 depending on the conditions of operation can perform different functions. If a direct current flows through the stationary winding, it performs the function of an inductor and the rotating winding performs the function of an armature of the measuring exciter. Conversely, if the direct current flows through the rotating winding, it becomes the inductor and the stationary winding becomes the armature.

The insulation resistance is measured (with the switch 6 in the $I_1$ position) as follows. A predetermined excitation current flows from the source 4 via the inductor winding 17 of the measuring exciter 10. As the armature winding 12 of the measuring exciter 10 rotates, a proportional e.m.f. is induced in it, to be rectified by the rectifier 9. The rectified voltage is applied from the rectifier 9 to the insulation of the circuits of the rotor 1 relative to its frame via the field winding 11 of the measuring synchronous generator 8, with the result that a current proportional to the insulation resistance flows in that winding. As the energized winding 11 rotates relative to the winding 19 of the measuring synchronous generator 8, an e.m.f. is induced in that winding, proportional to the current in the winding 11, that is, determined by the insulation resistance. This emf is measured by the meter 18 which may be calibrated to read directly in units of resistance. Since the circuit containing the rectifier 9 and the winding 11 is connected between equipotential points relative to the voltage across the rotor 1, which is the case when the insulation resistance is disturbed uniformly, the voltage of the circuit of the rotor 1 has no effect on the readings of the meter 18.

If the insulation resistance is distributed other than uniformly, the voltage across the rotor 1 will generate an interference signal which may be registered as follows.

In the $I_1$ position of the switch 6, the insulation resistance $R_o$ is read from the resistance scale and, at the same time, the voltage $V_o$ from the voltage scale. After that, the switch 6 is moved to the $I_2$ position. Since the supply source 4 is disconnected, the current flowing in the circuit of the winding 11 will be solely due to the voltage across the rotor 1, that is, will be a purely interference current. As the winding 11 rotates, a proportional e.m.f. is induced in the winding 19, and the meter 18 measures the interference voltage U.

The effect produced by the interference current depends on its direction which is in turn dependent on the location of the reduced insulation resistance relative to the rotor 1. To determine the direction of the interference current, the switch 6 is moved to the O position.

If a reduced insulation resistance is located closer to the positive side of the rotor 1, then, with the polarity of the rectifier 9 as shown in FIG. 1, the interference current will flow from the point 14 to the point 13, by-passing the winding 12, via the diodes of the rectifier 9. Since there is no current flowing in the winding 12, the meter 18 connected to the winding 20 will read zero. In this case, the actual insulation resistance can be found from the measured one by the equation:

$$R = \frac{R_0 + \frac{U}{U_0} R_{11}}{1 - \frac{U}{U_0}},$$

where $R_{11}$ is the resistance of the winding 11.

If a reduced insulation resistance is located closer to the negative side of the rotor 1, the interference current will flow from the point 13 to the point 14 via the resistors 16 and the winding 12. As the energized winding 12 is now rotated relative to the winding 20, an e.m.f. will be induced in the latter, and the meter 18 will give an indication other than zero. In this case, the actual insulation resistance can be found by the equation:

$$R = \frac{R_0 - \frac{U}{U_0}(R_{11} + R_{16} + R_{12})}{1 + \frac{U}{U_0}},$$

where $R_{16}$ is the total resistance of the resistors 16, and $R_{12}$ is the resistance of the winding 12.

The insulation resistance is measured periodically, taking up not more than 20 seconds each time (as is generally necessary to read the meters and write down their readings in the $U_1$, $U_2$ and O positions of the switch).

Between measurements, the apparatus operates with the switch 6 in the C position, to actuate the alarm in the case of an insulation breakdown.

When no breakdown occurs, the supply source 4 is disconnected, and the meter reads no or an insignificant signal.

In the case of an insulation break-down on the positive side of the rotor 1, the voltage across the rotor 1 will cause a current to flow in the winding 11 from the point 14 to the point 13, having a maximum magnitude since the resistance of this circuit is a minimum. Accordingly, the meter 18 will register a maximum deflection, and the limiter 21 will limit it to a value falling within the limits of the alarm zone marked + on the scale of the meter 18 (the scale is not shown in FIG. 1).

In the case of an insulation breakdown on the negative side of the rotor 1, the voltage across the rotor 1 will cause a current to flow in the winding 11 from the point 13 to the point 14, via the resistors 16 and the winding 12, with a magnitude lower than it has in the case of a breakdown on the positive side of the rotor, because the circuit has a greater resistance. Accordingly, the meter 18 will deflect through a smaller angle so that the pointer will find itself within the sector marked − on the scale.

Figure 2:
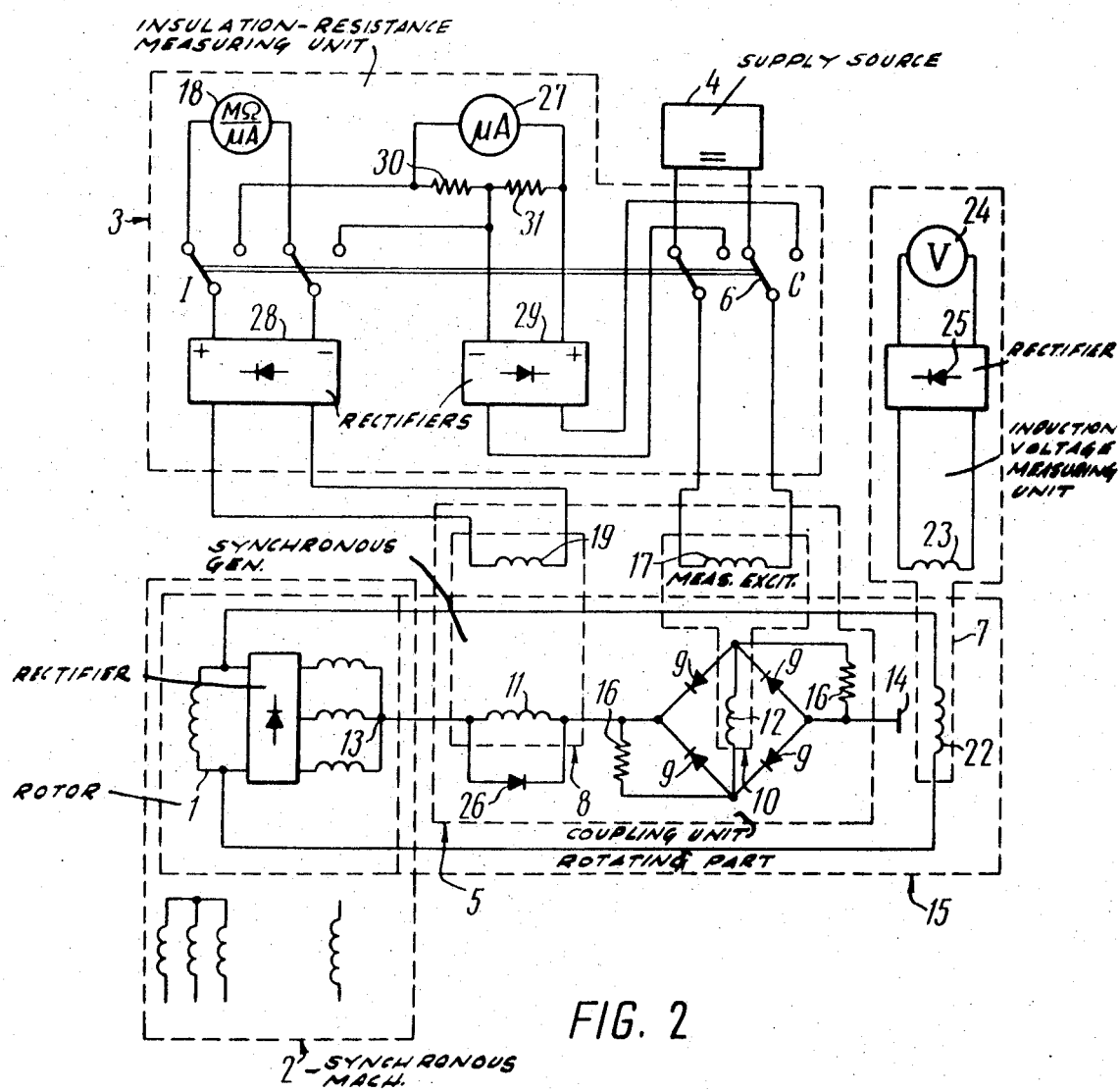
FIG. 2 is a schematic circuit diagram of the same apparatus in which the field winding of the synchronous generator is shunted by a diode and the meter of the measuring unit has a center-zero scale.

For better accuracy in breakdown indication and in order to simplify the measurement of insulation resistance, use should preferably be made of the apparatus shown in FIG. 2. In this case, the coupling unit has the field winding 11 of the measuring synchronous generator 8 shunted by a diode 26 connected in opposition to the rectifier 9.

The meter 18 is a d.c. instrument supplemented by a meter 27 with a center-zero scale, and two rectifiers 28 and 29 which are shunted by resistors 30 and 31 in the breakdown alarm position of the switch 6.

In this position of the switch 6, the supply source 4 is disconnected, the armature winding 19 of the generator 8 is connected via the rectifier 28 to the meter 27 which also accepts the inductor winding 17 of the exciter 10 via the rectifier 29, so that the two rectifiers 28 and 29 are interconnected in series-opposition, and their unoccupied terminals are connected to the meter.

In the I position of the switch 6, which corresponds to measuring the insulation resistance, the meter 27, the rectifier 29, and the registers 30 and 31 are disconnected from the windings 17 and 19, the rectifier 28 is connected to the meter 18, and the supply source 4 is connected to the winding 17.

In the measurement condition, the apparatus disclosed herein operates as explained in FIG. 1 for the $I_2$ position of the switch 6.

In the C position of the switch 6 and in the case of a break-down on the positive side of the rotor, the apparatus operates as already explained with respect FIG. 1 with the only exception that an indication of the breakdown is given by the meter 27 through which the current from the rectifier 28 has its path via the resistor 31. The rectifier and the meter are connected in such a polarity that the meter deflects in the positive direction.

In the case of a breakdown on the negative side of the rotor, the voltage across the rotor 1 causes a current to flow from the point 13 to the point 14 via the diode 26, bypassing the winding 11, and then via the resistors 16 and the winding 12. As a result, when the windings 11 and 12 rotate, no emf is induced in the winding 19, while in the winding 17 it is. This emf is applied via the rectifier 29 and the resistor 30 to the meter 27 where it gives rise to a current with reverse polarity, so that the meter will deflect in the negative direction.

To allow for the effect of the voltage across the rotor 1 on the results of measurement, it is necessary to note the respective voltage $V_o$ on the voltage scale of the meter 18 in addition to the insulation resistance $R_o$ read on the resistance scale in the U position of the switch while in the C position of the switch 6 it is necessary to measure the signal U. When $U > 0$, the actual insulation resistance will have the value $$R = \frac{R_0 + A\dfrac{U}{U_0}(R_{11} + kR_{22})}{1 - A\dfrac{U}{U_0}}$$

When $U < 0$, the insulation resistance will be given by:

$$R = \frac{R_0 - B\dfrac{U}{U_0}(R_{16} + R_{12} + kR_{22})}{1 + B\dfrac{U}{U_0}}$$

where $A$ and $B$ are the coefficients found by experiment (or by calculation), $k = 0$, and $R_{22}$ is the resistance of the winding 22.

The zero-potential (datum) point 13 may be difficult of access physically, such as in the brushless synchronous machine 2 where the rectifier circuit is a star with neutral terminal. In such a case, the datum point required for operation of the apparatus disclosed herein may be produced artificially by means of two resistors of a relatively low value. However, additional space would be required for their arrangement on the rotor and additional facilities for the removal of the heat dissipated by the resistors, so that the apparatus as a whole would increase in size and be complicated in design.

Figure 3:
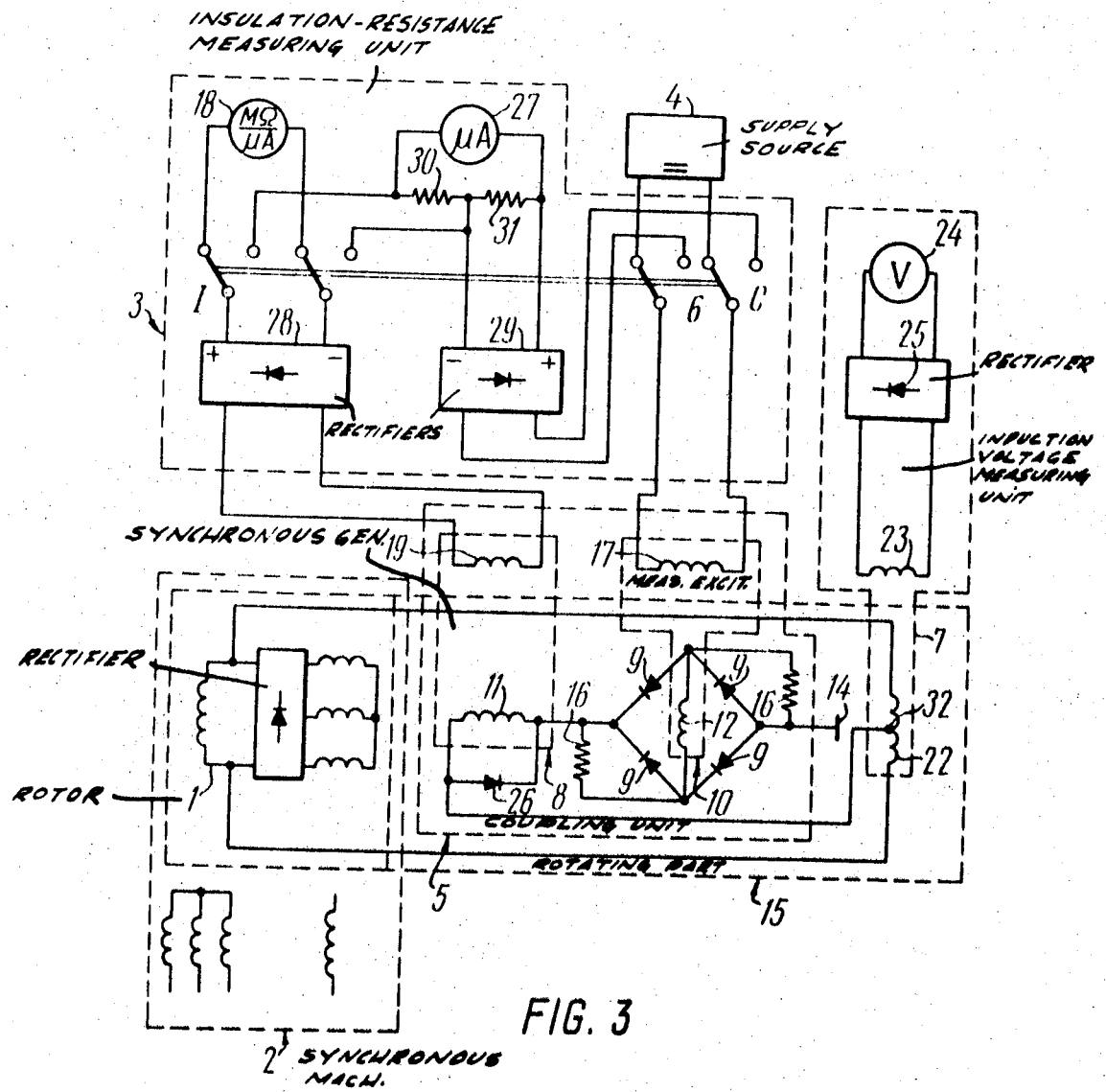
FIG. 3 is a schematic circuit diagram of the apparatus of FIG. 2 in which the zero-potential point is the center tap on the inductor winding of the voltage sensor.

In order to reduce the size of the apparatus as a whole, the zero-potential (datum) point for the rotor 1 is the center tap 32 on the inductor winding 22 of the induction voltage sensor 7, as shown in FIG. 3.

In this case, the apparatus operates as already explained with respect to FIG. 2, except that the point 13 is replaced by the point 32, and in the equations for the insulation resistance $k = 0.25$.

It is convenient to make the rotary part 15 of the device physically integral, owing to which it is preferable to place the windings 17, 19, 20, and 23 on a common frame. If, in such a case, the winding 23 has to be made of three-phase construction in order to reduce the ripple in the applied voltage, the overall dimensions of the apparatus as a whole may be reduced by arranging the winding 23 as shown in FIG. 4.

Electrically, the winding 23 has two layers, but mechanically it has four layers, so that when there are three phases ($m = 3$), and the number of poles is a multiple of the mechanical number of layers, the winding retains symmetry, the end connections of the winding 23 do not cross one another and are all placed in the same plane normal to the axis of rotation.

As a result, the axial overall dimensions of the apparatus are reduced, which is essential to the brushless excitation system as a whole.

Figure 4:
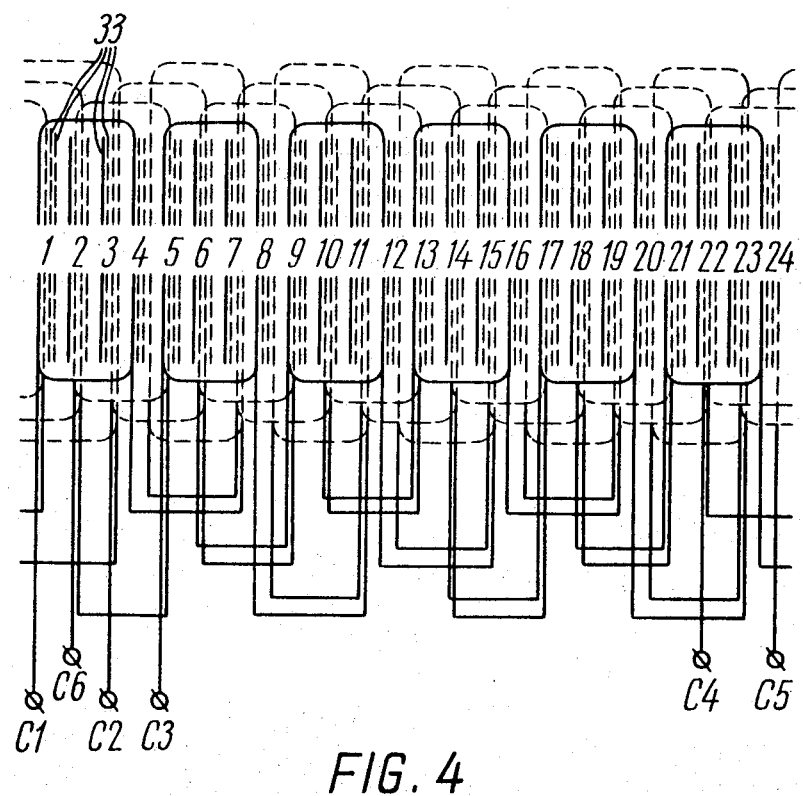
FIG. 4 shows the connections of the armature winding in the induction voltage sensor.

FIG. 4 shows the slots 1' through 24' in the core, the retainers 33 made of an insulating material and filling the voids in the said slots of the core, and the taps C1, C2, C3, C4, C5, and C6 of the winding.

The apparatus of FIGS. 1 and 2 may consist of two separate parts, one used to measure the insulation resistance and the other to measure the voltage, arranged so that the use of any one of the two parts will not entail the simultaneous use of the other.

An industrial power-engineering laboratory has built and tested a mock-up of the apparatus disclosed herein and also a prototype of this apparatus for the brushless excitation system of a 200-MW turboalternator. Both the mock-up and the prototype have passed their respective tests successfully.

What is claimed is:

1. An apparatus for measuring the insulation resistance of a brushless synchronous machine including a rotor and a frame supporting said rotor, said rotor having a zero-potential (datum) point, said apparatus comprising:

an insulation resistance measuring unit including a switch and a meter, said switch having a plurality of positions;

a supply source;

a coupling unit connecting the rotor of said synchronous machine to said insulation resistance measuring unit;

a rotary rectifier;

said coupling unit including a measuring synchronous generator and a measuring exciter connected for rotation with said synchronous machine; said measuring exciter including an armature winding and a stationary winding; said measuring synchronous generator including a rotating field winding fed from the armature winding of said measuring exciter through said rotary rectifier, said measuring synchronous rotating field winding also including a stationary winding;

said field winding of said measuring synchronous generator and said rotary rectifier being connected between the zero-potential (datum) point of the rotor of said synchronous machine and the frame of said rotor;

said rotary rectifier including a plurality of diodes and resistors shunting at least some of the diodes of said rotary rectifier;

said supply source being connected to the stationary winding of said measuring exciter, the meter of said measuring unit being connected to the stationary winding of said measuring synchronous generator with said switch correspondingly positioned in an insulation resistance measuring position;

said meter, with said supply source disconnected, being connected to one of the windings of said measuring synchronous generator with said switch in insulation breakdown signalling position or to the winding of the inductor of said measuring exciter in other positions of said switch.

2. An apparatus as claimed in claim 1 comprising a further diode and wherein the field winding of the measuring synchronous generator is shunted by said further diode which is connected in opposition to the rotary rectifier, the meter of said measuring unit being a center-zero meter and being connected in one of the positions of said switch to the like terminals of two rectifiers included by the measuring unit in series-opposing connection and shunted by resistors included by said unit; one of said rectifiers of the measuring unit being connected to one of said windings of said measuring synchronous generator, and the other to one of said windings of said measuring exciter.

3. An apparatus as claimed in claim 1 wherein the rotor circuit of said brushless synchronous machine includes an induction voltage measuring unit comprising:

a rotating inductor winding;

a stationary armature winding;

said rotating inductor winding of said induction voltage measuring unit including a center tap constituting the zero-potential (datum) point of the rotor circuit of said brushless synchronous machine.

4. An apparatus as claimed in claim 3 wherein said armature winding of said induction voltage measuring unit is a three-phase two or four layer winding including end connections placed in one plane perpendicular to the axis of rotation of said rotor.

* * * * *